Oct. 31, 1967  J. E. MEINHARD  3,350,186
PROCESS FOR ENCAPSULATING MATERIALS WITH A THERMALPLASTIC COVER
Filed Dec. 21, 1964  2 Sheets-Sheet 2

INVENTOR.
JAMES E. MEINHARD
BY
Dock N. Jeu
AGENT 3,350,186
PROCESS FOR ENCAPSULATING MATERIALS WITH A THERMOPLASTIC COVER
James E. Meinhard, Santa Ana, Calif., assignor, by mesne assignments, to McDonnell Douglas Corporation, Santa Monica, Calif., a corporation of Maryland
Filed Dec. 21, 1964, Ser. No. 420,003
12 Claims. (Cl. 65—36)

ABSTRACT OF THE DISCLOSURE

A process which comprises forming a seal in cover material compatible with core material to be encapsulated, placing core material therein adjacent to the seal, applying vacuum to the cover material side containing the core material and sealing off that side, heating the seal and core material region to collapse the cover material around the softened core material, and stretching the heat-softened region to form an elongate rod of encapsulated core material. To prevent the heat-softened cover material from ballooning out any time, ambient pressure is maintained greater than any internal gas pressure generated by the core material.

My present invention relates generally to a process for encapsulating a substantial and predetermined portion of one material with a relatively thin and uniform layer of another material. More particularly, the invention relates to a process for producing a resultant product wherein a very small diameter thermoelectric or semiconductor material in generally cylindrical form is cylindrically encapsulated with a thin and uniform layer of, for example, glass.

Thermoelectric or semiconductor materials are often used in relatively small quantities in various electrical applications, as is well-known. These materials frequently need the additional protection of, for example, an encapsulating glass envelope or casing to give the materials mechanical support and shielding under many applications of the materials. Of course, this is true not only for thermoelectric or semiconductor materials but for any other material used in practically all applications.

Since only small quantities of thermoelectric or semiconductor materials are required for various uses of these materials, it is desirable to make the materials in cylindrical form which has reasonably uniform and good structural and electrical characteristics. However, it is extremely difficult, if not impossible, to make these or any materials in very small diameter, cylindrical form, by conventional sawing or machining methods.

A glass envelope or casing which intimately encapsulates a thermoelectric or semiconductor material provides high temperature electrical insulation for the material. It also helps prevent degradation of the material at high use temperatures and improves thermal efficiency by reflecting a portion of heat back into the material. A major problem is encountered, however, in actually providing a continuous, nonporous glass envelope or casing in full and direct contact with a very small diameter cylinder of material which may be highly brittle and readily subject to oxidation.

Bearing in mind the foregoing discussion, it is an object of my invention to provide a novel and useful process for effectively and easily encapsulating, for example, thermoelectric or semiconductor material of very small diameter with a thin and uniform layer of protective material such as glass.

Another object of this invention is to provide a process which can easily form glass encapsulated materials of a cylindrical form at any selected, very small diameter.

A further object of the invention is to provide a process for encapsulating material, which may be highly brittle and readily subject to oxidation, with another material of different characteristics.

A still further object of this invention is to provide a process which will effectively encapsulate a material with a glass envelope or casing without any entrapment of air bubbles therein or ballooning of the envelope or casing due to any gases that may be generated by the material.

Briefly, and in general terms, the foregoing and other objects are preferably accomplished by providing a process for encapsulating a core material with a cover material which comprises the steps of selecting a cover material having physical and chemical properties compatible with those of the core material, applying heat to a selected point of a tubing made of the cover material, forming a seal at the selected point in the tubing, placing a predetermined amount of the core material in the tubing on one side adjacent to the seal, applying vacuum to the side of the tubing containing the core material to remove air therefrom and sealing off that side, applying heat to the tubing at the region including the core material and adjacent seal to soften the tubing such that it collapses around the core material which also melts, pulling the tubing apart to stretch the heat softened region, and forming a cylindrical rod of core material that is encapsulated by the cover material. A slightly different version of this process includes maintaining the ambient pressure greater than the internal pressure due to any gases that may be generated by the core material, particularly when molten, to prevent the heat-softened cover material from ballooning out at any time during the process.

My invention will be more fully understood, and other features and advantages thereof will become apparent, from the following detailed description of an illustrative series of operations performed according to this invention. The detailed description should, of course, be considered in conjunction with the accompanying drawings, in which:

FIGURES 1, 2, 3, 4, 5 and 6 respectively show successive steps which are performed in my process for encapsulating a core material with a selected cover material;

Figure 1:
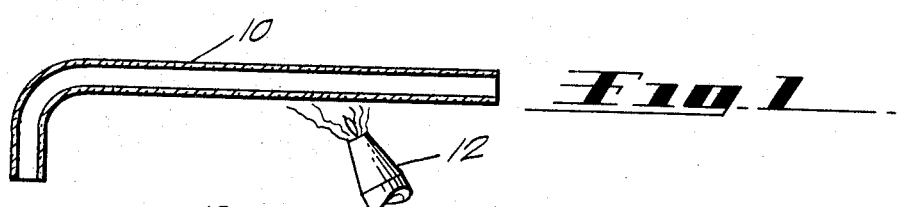

FIGURE 1 shows, for example, a glass tubing 10 which is subjected to heat from a torch 12 or any other suitable heat source at a point towards the middle of the length of the tubing 10. The tubing 10 is an ordinary cylindrical tubing which is illustratively chosen to be made of Pyrex.

Figure 2:
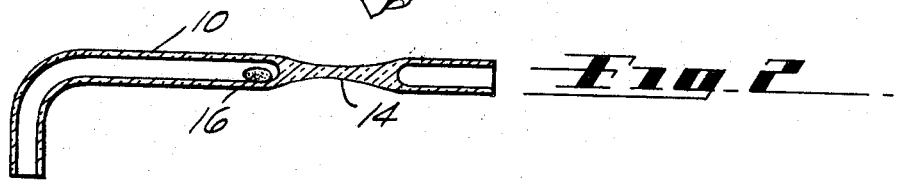

FIGURE 2 shows the seal 14 which was formed in the tubing 10 by means of the torch 12. A charge of thermoelectric or semiconductor material 16 is placed in the tubing 10 next to the seal 14 as shown. In this instance, the charge 16 is lead telluride, for example. The glass of tubing 10 should be chosen so that it has a softening point in the region of the melting point of the charge 16. Thus, Pyrex glass serves adequately for lead telluride in this regard.

The glass of tubing 10 should have a thermal coefficient of expansion equal to, or slightly lower than, the material of the charge 16. The material of the charge 16 normally should not react chemically with the glass, as this would introduce impurities into the material.

Figure 3:
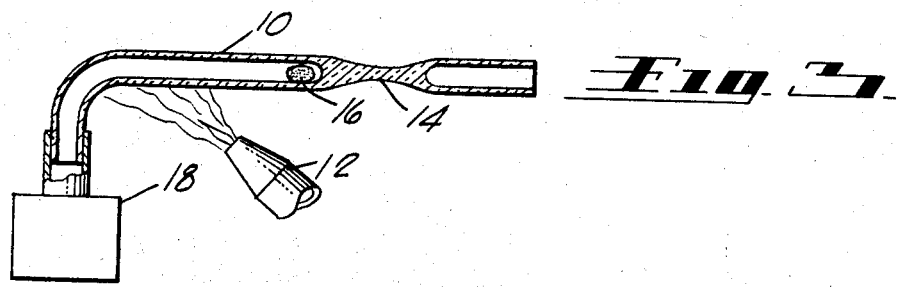

FIGURE 3 shows the left end of the tubing 10 connected to a vacuum source 18. This source 18 could, for example, be a diffusion pump or the like. Suitable valves and connections are, of course, utilized but are not specifically indicated in FIGURE 3 in order to maintain clarity of illustration. The vacuum source 18 is used to effect scrupulous removal of air from the tubing 10 on the left side of the seal 14. The left side of the tubing 10 can then be sealed off by means of the torch 12 as indicated.

Figure 4:
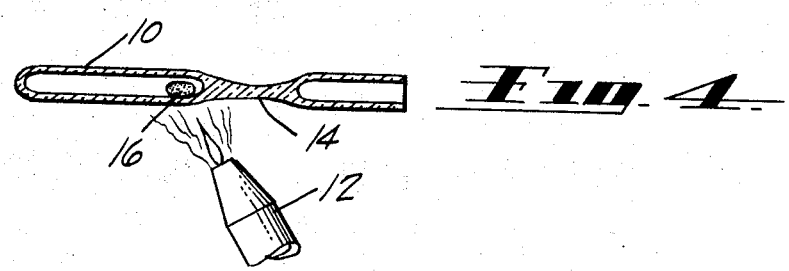

FIGURE 4 illustrates the application of heat from torch 12 to cause the glass to soften and collapse around the charge 16 which also melts. Vacuum is, of course, maintained in the tubing 10 on the left side of the seal 14.

The use of vacuum to remove air from the left part of the tubing 10 produces positive collapse of the heat-softened glass around the charge 16 due to external atmospheric or other ambient pressure. It also eliminates any entrapment of air bubbles between the charge core and glass insulator, and prevents oxidation of oxygen-sensitive metals or semiconductors which may constitute the core.

Figure 5:

FIGURE 5 shows the molten charge 16 which is fully surrounded by the heat-softened glass of the tubing 10. When molten, the charge 16 should not generate gases which would cause the glass envelope to balloon out. If gases are, however, generated, the internal pressure due to these gases should not exceed the external atmospheric or other ambient pressure. Increasing the external ambient pressure until it exceeds the internal pressure due to the generated gases would prevent ballooning of the glass envelope.

Figure 6:
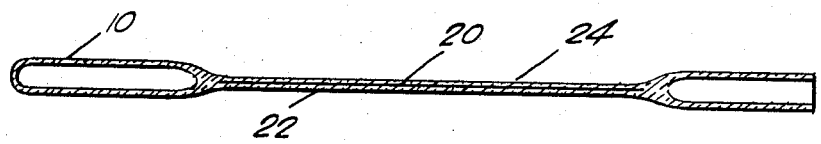

FIGURE 6 shows the result wherein the tubing 10 has been pulled apart to stretch the heat-softened region including the molten charge therein. The molten charge is shaped by the encapsulating glass during drawing and forms the core material into a cylindrical shape of very small diameter and cross sectional area.

It should be noted that such an encapsulated, cylindrically shaped core 20 of very small diameter and cross sectional area cannot be produced economically, if at all, by conventional machining techniques. Nor can semiconductor materials, which are normally brittle, be wire-drawn under ordinary processes.

Mechanical damage to the core material is minimized in this process because it solidifies in the glass envelope or casing 22 from a molten state. Conventional machining techniques would produce considerable mechanical damage to the core material, particularly where such material is a brittle semiconductor.

The molten charge in the cylindrically shaped core 20 freezes rapidly as the outer glass envelope or casing 22 cools to form a glass-encapsulated rod 24. This rapid freezing process improves the homogeneity of core 20 by preventing segregation of core material components. This is particularly desirable where the core 20 is an alloy material, for example. The formed rod 24 can be subsequently cut to any desired lengths for various applications.

Figure 7:
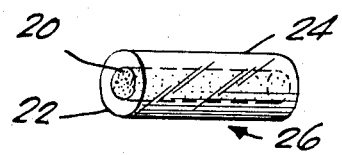
FIGURE 7 is a perspective view of the resultant product produced from this process.

FIGURE 7 shows a cut length or unit 26 of the rod 24. As can be seen in this view, the process produces articles in cylindrical form, which is difficult or impossible to do by conventional sawing processes. The process also makes small diameter encapsulated rods easily and minimizes saw damage (delamination) that would otherwise occur with conventional techniques. A large amount of material is also saved that would be lost as sawing waste as in the conventional techniques.

The diameter of the article can be controlled by the length that the heat-softened region including its molten charge is stretched. Thus, the longer is the stretched length, the smaller will be the diameter, of course.

The glass envelope or casing 22 around the material core 20 gives the core material mechanical support and protection. Many core materials greatly need this additional protection for use in various device applications. The glass encapsulation helps prevent degradation of core material at high use temperatures and improves thermal efficiency by reflecting a portion of heat back into the material.

It has been mentioned that the encapsulating material should have a thermal coefficient of expansion equal to, or slightly less than, that of the charge or core material. The purpose is to avoid as completely as possible the introduction of tensile or compressive strains which would arise from a mismatch in expansion coefficients and thus adversely affect the function of, for example, semiconductor core materials as they are normally used.

Where the glass envelope or casing 22 (FIGURE 6) has a thermal coefficient of expansion equal to, or slightly less than, the material of the core 20, breakage of the glass envelope or casing 22 on cooling, or during operation where the unit 26 (FIGURE 7) is exposed to high thermal gradients, will be prevented.

Figure 8:
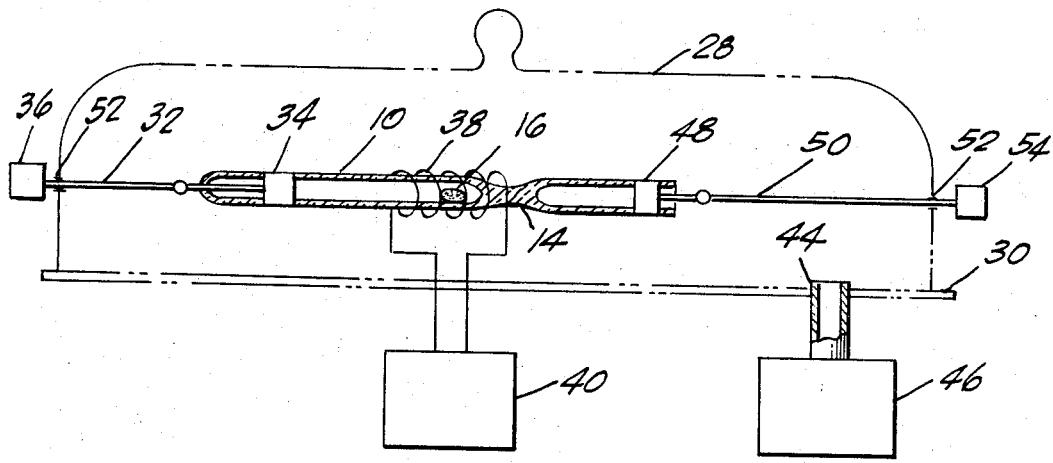
FIGURE 8 is a diagrammatic drawing showing illustrative apparatus which can be used in performing certain steps of a slightly different version of the invention.

FIGURE 8 diagrammatically illustrates apparatus for heating the tubing 10 to cause the glass to collapse around the charge 16 which is also melted while vacuum is maintained in the tubing 10 on the left side of seal 14 and ambient pressure is being maintained at a pressure greater than the internal pressure generated by gases from the charge 16. To accomplish this, the tubing 10 with its formed seal 14 and charge 16 in vacuum is suitably mounted within a fairly large bell jar 28 as shown in FIGURE 8.

The lower rim of the bell jar 28 forms an airtight seal with platform 30. The bell jar 28 rotatably and slidably mounts a connecting rod 32 having a clamp 34 on one end and clamp control means 36 on the other end. The platform 30 mounts a heating coil 38 of a heat source 40, and an outlet connection 44 from an ambient pressure source 46. Another clamp 48 is located on one end of a connecting rod 50 which is rotatably and slidably mounted in a seal 52 on the bell jar 28 and having clamp control means 54 located on the other end of rod 50. Appropriate types of seals are used as required at the various connection points of the different elements, of course. The clamps 34 and 48 are, for example, conventional spring-loaded pairs of clam shells which are respectively operated by the control means 36 and 54 through suitable connecting linkages.

The tubing 10 including charge 16 sealed in vacuum is mounted on the clamps 34 and 48 such that the heating coil 34 generally surrounds the charge 16 and the seal 14. At the same time, the ambient pressure of the interior of the bell jar 28 is set at a predetermined value by the pressure source 46 supplying an inert, or other, gas under pressure into the bell jar 28 through the outlet connection 44.

The heat source 40 is then energized to cause the heating coil 38 to radiate heat and collapse the glass around the charge 16, and also melt the charge 16, to form a molten charge which is fully surrounded by softened glass similar to that shown in FIGURE 6. The tubing 10 can be rotated and moved axially along the longitudinal axis thereof by the clamps 34 and 48 through the connecting rods 32 and 50 during the formation of a molten charge which is suitably surrounded by softened glass.

The tubing 10 can be continuously and uniformly rotated to prevent sagging of the molten glass. The seals 52 permit axial and rotational movements of the rods 32 and 50, and are reasonably pliable to permit some lateral movements of the clamps 34 and 48. The ambient pressure within the bell jar 28 is maintained by the source 46 throughout this time at a predetermined value greater than the internal pressure that may be produced by generated gases emanating from the molten charge.

After the glass has been properly collapsed about the charge 16 and the charge has melted, the heat source 40 is de-energized and rods 32 and 50 are carefully pulled outwardly to stretch the heat softened region and form a glass encapsulated rod similar to that shown in FIGURE 6. When the glass encapsulated rod has cooled, the pressure source 46 is de-energized and the outer control means 54 of the connecting rod 50 is operated to distend the clamp 48 and release the right end of the stretched tubing 10. After the clamp 48 is moved off the right end of the tubing 10, the bell jar 28 can be opened to remove the tubing 10 from the clamp 34 and out of coil 38. The glass encapsulated rod can then be cut as desired into units similar to that shown in FIGURE 7. It is also possible to use a vertical process in which a molten encapsulated charge is contained in a holder, or crucible, and is subsequently pulled upwards to stretch it.

The clamps 34 and 48 together with their respective connecting rods are, of course, mechanical arms which may be moved relative to each other within a pressurized region. The bell jar 28 is preferably made of fairly heavy glass which is transparent or has large windows therein for viewing manipulations made inside of the bell jar 28. The provision of an ambient pressure which exceeds the internal pressure due to any generated gases from the molten charge will prevent the glass envelope or casing from ballooning out from the surrounded charge.

Figure 9:
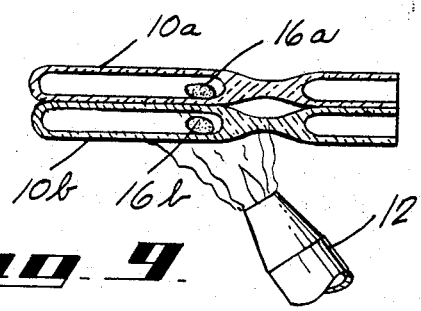
FIGURE 9 illustrates the formation of a multi-cored rod wherein two or more cores are encapsulated by the same envelope.

FIGURE 9 shows two (or more) tubings 10a and 10b having respective charges 16a and 16b sealed in vacuum jointly heated by torch 12. This causes each of the tubings 10a and 10b to collapse around their respective charges 16a and 16b, which also melt, and also fuses the tubings together. When the fused tubings are pulled apart, a single rod is formed having two substantially parallel and separately encased cores. The two tubings 10a and 10b effectively comprise a specially shaped tubular structure, and a single tubing can, of course, be used if the tubing is suitably shaped or provision is made to keep the different charges separated until each has been reasonably encapsulated by the molten envelope. Two or more tubings made of respectively different materials are desirably used where the associated charges are only compatible with the respective materials.

Glass encapsulated rods of less than one to a few millimeters in diameter and several inches long can be easily made by this process. Practically any material can be encapsulated by the process so long as the requirements summarized here are met:

(1) The encapsulating glass has a softening point in the region of the melting point of the charge material.

(2) The glass has a thermal coefficient of expansion equal to, or slightly lower than, that of the charge material.

(3) The glass does not react chemically with the charge material so as to introduce impurities into the charge material.

(4) When molten, the charge material does not generate gases which cause the glass envelope or casing to balloon out. If the molten charge material does generate gases, the ambient pressure is maintained greater than the internal pressure to prevent the glass envelope or casing from ballooning out.

Articles according to my process have been made from lead telluride and Pyrex glass, lead-tin solder and soft glass, germanium and Pyrex glass, copper and Pyrex glass, and indium arsenide and Pyrex glass. It is to be noted that the use of vacuum to remove air was particularly necessary in the process with oxygen sensitive charge materials to avoid oxidation of the charge at high temperatures. Germanium, for example, requires scrupulous removal of air during the process.

The process is, of course, enhanced by maintaining a high ambient pressure as in FIGURE 8 while maintaining a vacuum in the tubing 10 on the left side of the seal 14. The high ambient pressure increases the beneficial results of the vacuum which serves the purposes as summarized below:

(1) Provides positive collapse of the heat-softened glass around the charge due to external atmospheric or ambient pressure.

(2) Eliminates entrapment of air bubbles between core material and insulating envelope or casing.

(3) Prevents oxidation of oxygen sensitive metals and semiconductors.

Thus, it is apparent that my process can be used effectively on a wide variety of materials and that exceedingly well-encased charge cores can be obtained in cylindrical form at extremely small diameters and cross sectional areas. These diameters can, further, be easily controlled in this process.

It is, of course, to be understood that particular steps of the process and the apparatus utilized as described above and shown in the drawings, are merely illustrative of, and not restrictive on, the invention and that various changes in steps, mode of operation, design, structure and arrangement may be made without departing from the spirit and scope of the appended claims.

I claim:

1. A process for encapsulating a core material with a cover material, which comprises the steps of:

selecting a cover material having physical and chemical properties compatible with those of said core material;

forming a generally tubular structure from said cover material with a seal at a selected point in said tubular structure and;

placing a predetermined amount of said core material in said tubular structure on one side of said seal adjacent thereto;

applying vacuum to the side of said tubular structure containing said core material to remove any air therefrom;

applying heat to said tubular structure at a region including said core material and adjacent seal to soften said tubular structure to collapse the same around said core material and melt the latter; and pulling said tubular structure apart to stretch the heat-softened region and forming an elongate rod of said core material which is encapsulated by said cover material.

2. A process according to claim 1 wherein said cover material is selected to have a softening point in the region of the melting point of said core material.

3. A process according to claim 1 wherein said cover material is selected to have a thermal coefficient of expansion generally equal to that of said core material.

4. A process according to claim 1 wherein said cover material is selected to be chemically nonreactive with said core material.

5. A process for encapsulating a core material with a cover material, which comprises the steps of:

selecting a cover material having physical and chemical properties compatible with those of said core material;

forming a generally tubular structure from said cover material;

applying heat to a selected point on said tubular structure and forming a seal at the selected point;

placing a predetermined amount of said core material in said tubular structure on one side of said seal adjacent thereto;

applying vacuum to the side of said tubular structure containing said core material to remove any air therefrom;

maintaining an ambient pressure about said tubular structure at a pressure greater than the internal pressure due to any gases generated by said core material at any time;

applying heat to said tubular structure at a region including said core material and adjacent seal to soften said tubular structure to collapse the same positively around said core material and melt the latter;

pulling said tubular structure apart to stretch the heat-softened region and forming an elongate rod of said core material which is encapsulated by said cover material; and reducing the ambient pressure maintained about said tubular structure to a safe pressure.

6. A process according to claim 5 wherein said cover material is selected to have a softening point in the region of the melting point of said core material.

7. A process according to claim 5 wherein said cover material is selected to have a thermal coefficient of expansion generally equal to that of said core material.

8. A process according to claim 5 wherein said cover material is selected to be chemically nonreactive with said core material.

9. A process for encapsulating a core material with a glass material, which comprises the steps of:
  selecting a glass tubing having physical and chemical properties compatible with those of said core material; applying heat to a selected point on said tubing and forming a seal at the selected point;
  placing a predetermined amount of said core material in said tubing on one side of said seal adjacent thereto;
  applying vacuum to the side of said tubing containing said core material to remove any air therefrom;
  applying heat to said tubing at a region including said core material and adjacent seal to soften said tubing to collapse the same around said core material and melt the latter; and
  pulling said tubing apart to stretch the heat-softened region and forming an elongate rod of said core material which is encapsulated by said glass material.

10. A process for encapsulating a brittle and oxygen-sensitive core material with a glass material, which comprises the steps of:
  selecting a glass tubing having physical and chemical properties compatible with those of said core material;
  applying heat to a selected point on said tubing and forming a seal at the selected point;
  placing a predetermined amount of said core material in said tubing on one side of said seal adjacent thereto;
  applying vacuum to the side of said tubing containing said core material to remove any air therefrom;
  maintaining an ambient pressure about said tubing at a pressure greater than the internal pressure due to any gases generated by said core material at any time;
  applying heat to said tubing at a region including said core material and adjacent seal to soften said tubing to collapse the same positively around said core material and melt the latter; and
  pulling said tubing apart to stretch the heat-softened region and forming an elongate rod of said core material which is encapsulated by said glass material.

11. A process for encapsulating a core material with a cover material, which comprises the steps of:
  selecting a cover material having physical and chemical properties compatible with those of said core material;
  forming a generally tubular structure with a seal at a selected point from said cover material;
  placing predetermined and separated amounts of said core material in said tubular structure on one side of said seal adjacent thereto;
  applying vacuum to the side of said tubular structure containing said core material to remove any air therefrom;
  applying heat to said tubular structure at a region including said core material and adjacent seal to soften said tubular structure to collapse the same respectively around said separated amounts of core material and melt the latter; and
  pulling said tubular structure apart to stretch the heat-softened region and forming an elongate rod of separate core materials which are encapsulated by said cover material.

12. A process for encapsulating core materials with respective cover materials, which comprises the steps of:
  selecting cover materials having physical and chemical properties compatible with those of respective core materials;
  forming individual tubular structures respectively from said cover materials, said tubular structures each having a seal at a selected point therein;
  placing a predetermined amount of each of said core materials in a corresponding one of said tubular structures on one side of each seal adjacent thereto;
  applying vacuum to the side of each of said tubular structures containing said core materials to remove any air therefrom;
  applying heat to said tubular structures at a region including said core materials and adjacent seals to soften said tubular structures and collapse the same around their respective core materials, melting the latter and fusing said tubular structures together; and
  pulling said fused tubular structures apart to stretch the heat-softened region and forming an elongate rod of separated core materials which are respectively encapsulated by a corresponding one of said cover materials.

References Cited
UNITED STATES PATENTS

| | | | |
|---|---|---|---|
| 3,091,104 | 5/1963 | Morrill | 65—110 X |
| 3,249,988 | 5/1966 | Sapoff | 65—54 X |
| 3,271,124 | 9/1966 | Clark | 65—54 |

DONALL H. SYLVESTER, *Primary Examiner.*

A. D. KELLOGG, *Assistant Examiner.*